United States Patent [19]
Chamberland et al.

[11] Patent Number: 5,807,418
[45] Date of Patent: *Sep. 15, 1998

[54] ENERGY RECOVERY IN OXYGEN-FIRED GLASS MELTING FURNACES

[75] Inventors: Ray Paul Chamberland, Sandy Hook, Conn.; Hisashi Kobayashi, Putnam Valley, N.Y.

[73] Assignee: Praxair Technology, Inc., Danbury, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 646,821

[22] Filed: May 21, 1996

[51] Int. Cl.$^6$ .................................................. C03B 5/16
[52] U.S. Cl. ...................... 65/134.4; 65/134.6; 65/136.1; 65/337
[58] Field of Search ...................... 65/134.4, 134.6, 65/136.1, 134.1, 135.9, 335, 337, 346, 347, 339, 345, 27; 432/72, 82

[56] References Cited

U.S. PATENT DOCUMENTS

| | | | |
|---|---|---|---|
| 4,099,953 | 7/1978 | Rondeaux et al. | 65/335 |
| 4,292,064 | 9/1981 | Propster | 65/134.6 |
| 4,316,732 | 2/1982 | Propster et al. | 65/134.6 |
| 4,338,112 | 7/1982 | Propster | 65/134.6 |
| 4,789,990 | 12/1988 | Pieper | 373/32 |
| 4,852,118 | 7/1989 | Pieper | 373/32 |
| 4,882,736 | 11/1989 | Pieper | 373/32 |
| 4,941,478 | 7/1990 | Naber et al. | 65/134.6 |
| 5,006,141 | 4/1991 | Chen et al. | 65/134.6 |
| 5,057,133 | 10/1991 | Chen et al. | 65/27 |
| 5,203,859 | 4/1993 | Khinkis et al. | 432/30 |
| 5,536,291 | 7/1996 | Sorg et al. | 65/134.6 |

OTHER PUBLICATIONS

Kobayashi et al., "Technical and Economical Evaluation of Oxygen Enriched Combustion Systems for Industrial Furance Applications", Proceedings of 1986 Symposium on Industrial Combustion Technologies, Edited by M. A. Lukasiewice, pp. 153–163 (1986) Tang et al., Application of Pure Oxygen with Batch Preheating to Glass–Melting Furances, Ceramic Bulletin, pp. 1827–1830, (1990).

"Batch and Cullet Preheating for Oxy–fuel Melting: The New Paradigm for Cooperative Advantage", New York State Glass Industry Conference (1994).

*Primary Examiner*—Steven P. Griffin
*Attorney, Agent, or Firm*—Stanley Ktorides

[57] ABSTRACT

A method for improving the energy efficiency of oxygen-fired glass melting furnaces wherein heat from hot flue gases from the melting furnace is used to heat all or part of the combustion oxidant and thereafter to preheat at least a portion of the glass forming materials to be melted.

12 Claims, 4 Drawing Sheets

ENERGY RECOVERY IN OXYGEN-FIRED GLASS MELTING FURNACES

FIELD OF THE INVENTION

This invention relates generally to improving the energy efficiency in oxygen fired glass melting furnaces. More particularly, the invention is directed to recovering the energy from hot combustion products and using it to preheat both combustion oxidant and glass forming materials to be melted in the furnace.

BACKGROUND OF THE INVENTION

Conventional glass melting furnaces use air-fired burners to melt glass forming materials such as sand, soda ash, limestone, dolomite, feldspar, rouge and others, collectively referred to as batch. The glass forming materials may also comprise broken glass, such as scrap glass being recycled, or cullet. Because of the high temperatures required to melt glass forming materials, glass melting furnaces operate at temperatures that are among the highest of all industrial furnaces. Hot combustion products are generated in these furnaces; potentially, large amounts of heat can be lost as the combustion products proceed up the flue of the furnace.

It is known to recover energy from hot flue gases in conventional, air-based glass melting furnaces. For example, it is known to use the energy to preheat the combustion air. It is also known to preheat the glass forming materials being fed to the melter.

Recent developments in burner technology, along with more and more stringent air emission standards, have led to the increased adoption of oxygen-based combustion systems where combustion air is replaced by pure oxygen or by oxygen-enriched air. Oxygen-based combustion presents many advantages to the glass industry, e.g. higher flame temperature, reduced flue gas volume and lowered emissions of nitrogen oxides or $NO_x$. The need for higher furnace efficiency, however, remains of continued concern.

It is known to use enthalpy from the flue gases for preheating batch and/or cullet glass-forming materials. Oxygen-based glass melting, however, generates combustion products that can be well in excess of 2000° F., typically between 2400° F. and 2800° F. Carrying out batch and/or cullet preheating at such high temperatures is impractical because glass forming materials would soften and stick to the preheater surfaces.

Various techniques have been proposed to lower the temperature of the flue gas stream prior to the batch and/or cullet preheating step: adding air to the furnace flue gases, recirculating cooled flue gases emerging from the batch and/or cullet preheater to the furnace flue gas stream, or extracting heat by exposing flue gases to uninsulated surfaces. These techniques, however, are accompanied by energy losses. Generally, it has not been considered either safe or energy efficient to preheat combustion oxidants with high oxygen content, such as, for example, pure or nearly pure oxygen.

OBJECTS OF THE INVENTION

It is an object of the invention to provide a method for improving the energy efficiency of oxygen fired glass melting furnaces.

It is another object of the invention to provide a method for using waste energy from hot combustion products to safely heat pure combustion oxygen or oxygen-enriched air and also to preheat the glass forming materials fed to the furnace.

It is still another object of the invention to provide a method for using the heated oxidant to combust fuel without increasing the burner temperature and without producing excessive amounts of $NO_x$.

It is a further object of the invention to provide a method for using waste energy from hot combustion products to also heat the combustion fuel.

SUMMARY OF THE INVENTION

The above and other objects, which will become apparent to one skilled in the art upon a reading of this disclosure, are attained by the present invention which is:

A glass melting method having improved energy recovery comprising:

(A) passing heated glass forming materials into a melting vessel;

(B) combusting fuel and heated oxidant to produce hot combustion products and to provide heat for melting said glass forming materials in the melting vessel;

(C) withdrawing said hot combustion products from said melting vessel;

(D) transferring heat from said hot combustion products to an oxidant, said oxidant being at a temperature lower than said hot combustion products and having an oxygen concentration of at least 50 weight percent, to produce partially cooled combustion products and said heated oxidant; and (E) transferring heat from said partially cooled combustion products to glass forming materials to produce said heated glass forming materials.

As used herein the term "directly-fired furnace" means a furnace which employs one or more burners to combust fuel and oxidant in order to provide heat into the furnace for the purpose of heating the furnace charge.

As used herein, the term "indirect heat exchange" means heat exchange taking place between two fluids that are brought into heat exchange relation without any physical contact or intermixing of the fluids with each other.

As used herein, the term "direct heat exchange" means the bringing of two fluids or of a fluid and a solid into heat exchange relation with physical contact with each other.

As used herein, the terms "heat recovery" and "energy recovery" mean capturing waste energy or heat and making it available to the overall process.

As used herein the terms "nitrogen oxides" or "$NO_x$" mean one or more of nitrous oxide ($N_2O$), nitric oxide (NO), nitrogen trioxide ($N_2O_3$), dinitrogen tetroxide ($N_2O_4$), nitrogen dioxide ($NO_2$), trinitrogen tetroxide ($N_3O_4$) and nitrogen trioxide ($NO_3$).

DETAILED DESCRIPTION OF THE INVENTION

Figure 1:
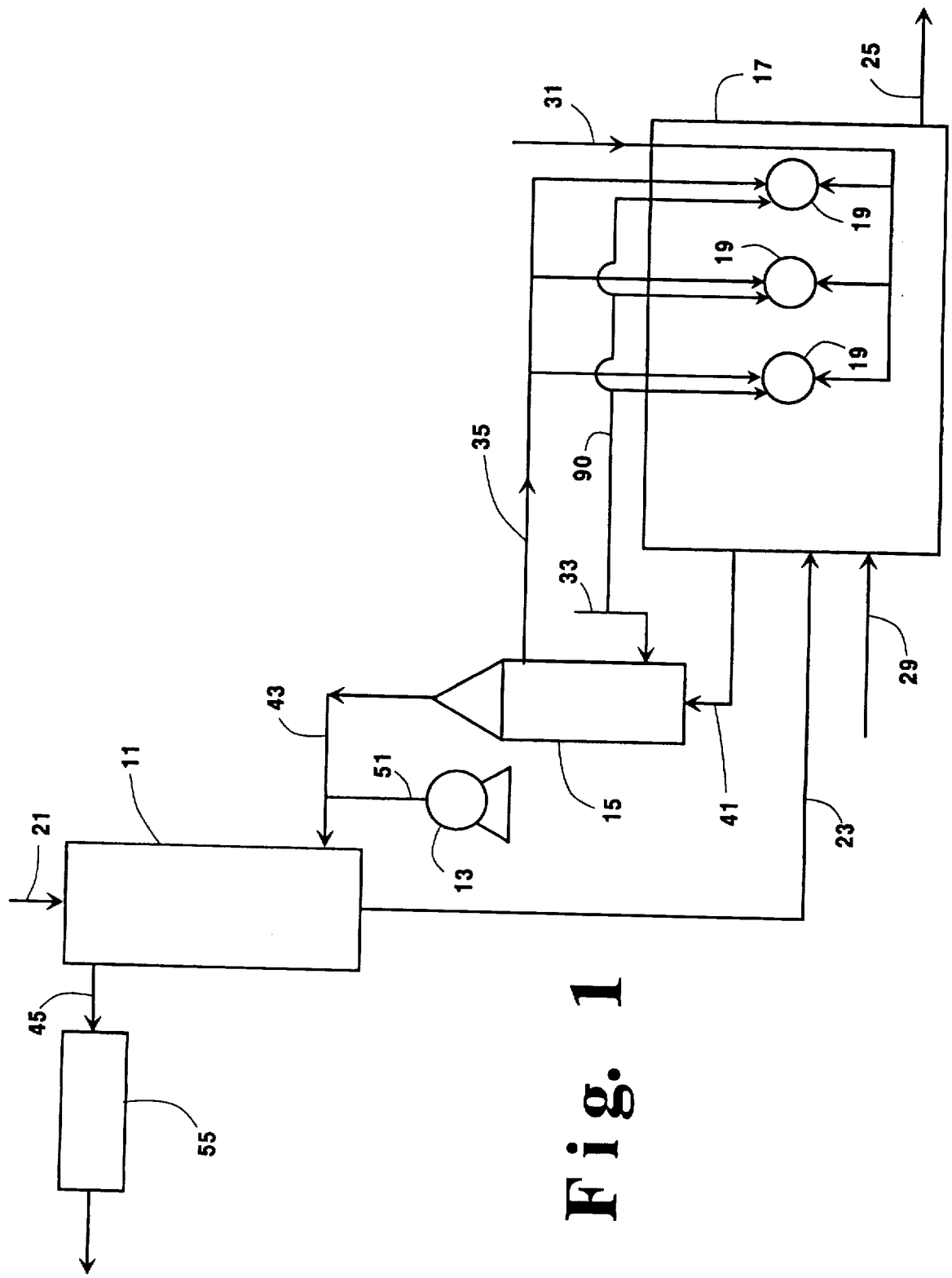
FIG. 1 is a simplified schematic representation of a glass melting vessel, preheating vessel and heat exchanger wherein the method of this invention may be practiced.

The invention relates to improving the energy efficiency of processes taking place in directly-fired glass furnaces heated by combusting fuel with oxygen-enriched oxidants. Oxygen based combustion generates very hot flue gases or combustion products; the temperatures observed are generally far greater than those seen with conventional air-based combustion. The invention relates to using heat from these hot combustion products to heat at least a portion of the combustion oxidant and also to heat some or all of the glass forming materials fed to the furnace. Oxidants that can be heated by practicing the invention include oxygen-enriched air and oxygen obtained from non-cryogenic as well as from cryogenic air separation processes; the oxygen concentration of the oxidant useful in the practice of this invention is within the range of from about 50 to about 99.9 weight percent; the invention is particularly useful in heating oxidants with an oxygen content of at least 90 weight percent.

Heating at least a portion of the combustion oxidant is advantageous in cases where the temperature of the hot combustion products is too high for preheating glass forming materials. Heating combustion oxygen not only cools the hot combustion products and readies them for preheating glass forming materials, but also redirects heat back to the process by supplying heated combustion oxidant to the furnace, thereby reducing fuel and oxygen requirements and the overall operation costs. Moreover, cooling the hot combustion products by heating the combustion oxidant can reduce or eliminate the need for adding dilution air and/or for recycling cold flue gases back to the preheater.

However, there are technical considerations that must be addressed when it is desired to combust fuel with a heated, oxygen-enriched oxidant. It is known that flame temperatures for oxygen-based combustion processes tend to be considerably higher than those observed with conventional, air-based combustion. Typically associated with these high flame temperatures is the possibility of heat-induced burner damage; non-water cooled burners are particularly susceptible to this kind of damage. In addition, high flame temperatures tend to favor the formation of nitrogen oxides. Both heat-induced burner damage and increased $NO_x$ levels can become more pronounced when the combustion oxidant carries additional heat.

It is a preferred embodiment of the invention to inject heated oxidant for combustion into the glass melting vessel separately from fuel. Accordingly the point of injection for fuel is spaced from the point of injection for the heated oxidant. A method of achieving this is disclosed and/or claimed in U.S. Pat. No. 5,076,779. A number of lances commercially available or known in the art may be used to separately inject the fuel and the oxidant. An example of a lance and gas injection system that can be used for injecting heated oxidant, and optionally fuel, into the melt vessel for combustion therein is disclosed and/or claimed in U.S. Pat. No. 5,266,025.

U.S. Pat. Nos. 5,267,850 and 5,411,395 disclose and/or claim a fuel jet burner system and combustion method employing a high velocity central fuel stream surrounded by a low velocity annular coaxial oxidant stream which may be employed in the practice of this invention. When using this system it is preferred to use up to 30% of the heated oxidant as the afore-mentioned low velocity annular coaxial stream. The remaining heated oxidant can be delivered at a point spaced from the fuel jet burner by using a lance or injection system as discussed above. The oxygen content of the oxidant supplied as the low velocity annular coaxial oxidant stream may be the same as or different from the oxygen content of the heated oxidant.

The invention can also be practiced by carrying out the combustion in stages. For example, fuel can be injected into the melting vessel along with a primary oxidant which provides up to 30% of the stoichiometric oxygen required to complete the combustion. A secondary oxidant, which is supplied at a point spaced from where the fuel and the primary oxidant are injected, is used to complete the combustion process. In order to minimize burner damage and the formation of $NO_x$, it is preferred that from about 70% to about 100% of the heated oxidant be supplied as the secondary oxidant in this staged combustion practice. Although the oxygen content of the primary and secondary oxidants may be the same, this is not necessary. It is thus possible to use air, enriched air, pure or nearly pure oxygen as the primary oxidant.

The invention can be practiced in both small and large glass melting systems, having capacities generally in the range of from 5 tons per day (TPD) to 600 tons per day. The invention will be described in greater detail with reference to the Figures.

FIG. 1, not drawn to scale, shows preheating vessel 11 which receives glass forming materials 21 needed in glass making. These materials may include but are not limited to: sand, limestone, dolomite, feldspar, soda ash, additives, colorants, fining agents and cullet. It is common in the industry to refer to glass forming materials as batch/cullet. Glass forming materials may be granular or pelletized and may contain cullet in any amount ranging up to 100%.

Glass forming materials may have different properties under preheating and some may soften more readily than others. It may be desired, therefore, to provide additional preheating vessels, similar to 11, to allow for independent control of preheating parameters (target temperature, rate of heating, etc.) for some of the glass forming materials. For example, it may be desired to preheat cullet separately from other glass forming materials. It may also be desired to preheat only some of the glass forming materials; other glass forming materials, such as shown at 29, may be passed into the glass melting vessel and melted without being passed through preheating vessel 11.

Glass forming materials emerge from preheating vessel 11 as heated glass forming materials 23 having a temperature generally within the range from 400° F. to 900° F. They are introduced, along with any other glass forming materials 29 that may not have been preheated, into melting vessel 17.

Melting vessel 17 is, for example, a directly fired glass melting furnace and is equipped with one or more burners 19. Preferably, burners 19 may be of the type disclosed and/or claimed in U.S. Pat. No. 5,266,025 and/or in U.S. Pat. Nos. 5,267,850 and 5,411,395. Burners 19 are used to combust fuel 31 with heated oxidant having an oxygen concentration of at least 50 weight percent. Burners 19 may use any suitable fuels 31 among which one can name natural gas, propane, light or heavy oils.

The combustion of fuel and oxidant generates enough heat to melt the glass forming materials which then exit melting vessel 17 as molten glass 25. The combustion of fuel and oxidant also generates hot flue gases or hot combustion products having a temperature generally within the range of from 2400° to 2800° F. Typically hot combustion products may include carbon dioxide, water vapor, nitrogen, oxygen and/or other components.

Hot combustion products are withdrawn from melting vessel 17 in stream 41 and are passed to heat exchanger 15. Preferably there is substantially no temperature reduction of the hot combustion products as they pass from vessel 17 to heat exchanger 15 other than that caused by heat loss through the walls of the conduit running from melter 17 to exchanger 15. Heat exchanger 15 also receives an oxidant having an oxygen content of at least 50 weight percent, shown as oxidant stream 33. The oxidant stream is at a temperature lower than the temperature of the hot combustion products. Usually oxidant stream 33 is supplied to heat exchanger 15 at ambient temperature.

Figure 2:
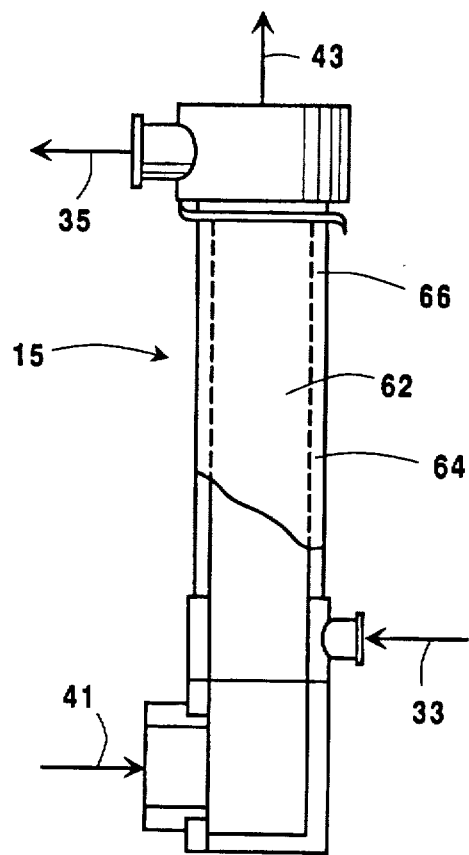
FIG. 2 is a simplified vertical cross-sectional view of a preferred embodiment of a heat exchanger which may be used in the practice of the invention.

Preferably, heat exchanger 15 provides indirect heat exchange. Several heat exchanger designs may be used to practice the invention. One embodiment for heat exchanger 15 is illustrated in FIG. 2, not drawn to scale. Heat exchanger 15 has at least one inner chamber 62 enclosed within outer chamber 64. Wall 66 separates inner chamber 62 from outer chamber 64. An inner flow path is created through inner chamber 62 and an outer flow path is created through outer chamber 64. Preferably, hot combustion products 41 are introduced to inner chamber 62 as the inner flow path and oxidant stream 33 is introduced to outer chamber 64 as the outer flow path.

Both co-current and counter-current flow heat exchangers can be used to practice the invention. In a preferred embodiment, the indirect heat exchange process in heat exchanger 15 is carried out under co-current flow conditions; accordingly both hot combustion products 41 and oxidant stream 33 pass through heat exchanger 15 in the same direction. This is advantageous because hot combustion products, at their highest temperature upon entering heat exchanger 15, first come in indirect contact, through wall 66, with oxidant stream 33 which is at its lowest temperature when entering heat exchanger 15. Thus hot combustion products 41 are immediately cooled and can proceed through inner chamber 62 without heating the heat exchanger beyond practical limits.

Heat exchanger 15 is constructed using such materials and in a way that renders it compatible with and safe for handling oxygen-rich oxidants and high temperatures. An advantage of heat exchanger 15 is its compact design. This is made possible by employing the oxidant useful with this invention which contains relatively low amounts of nitrogen and thus requires less volume than would a system employing air as the oxidant.

As they proceed through heat exchanger 15, the hot combustion products are partially cooled and emerge as partially cooled combustion products 43, having a temperature generally within the range of from 2000° F. to 2400° F., while the oxidant is heated and exits heat exchanger 15 as heated oxidant 35, having a temperature generally within the range of from 800° F. to 1500° F. More modest heating of oxidant stream 33 can also be obtained practicing the invention and, if necessary, heated oxidant 35 at temperatures as low as, for example, 200° F. can be supplied for the combustion process.

Heated oxidant 35 is passed to melting vessel 17 wherein it is combusted with fuel as discussed above. In order to maintain $NO_x$ production and the burner temperature within acceptable levels, it is preferred that heated oxidant be combusted using the burners and/or the combustion methods discussed above. In some cases the heated oxidant may be all the oxidant needed to completely combust the fuel. As discussed above, however, the combustion may require additional oxidant, usually at a lower temperature than that of heated oxidant 35. In FIG. 1 the additional combustion oxidant is shown as a portion 90 of oxidant stream 33. It is also possible to add oxidant that has an oxygen content that is different from that of heated oxidant 35. If desired, the additional oxidant may be air.

From heat exchanger 15, partially cooled combustion products 43 are passed to preheating vessel 11, wherein they are further cooled by heat exchange with glass forming materials 21, and exit the preheating vessel as cooled combustion products 45.

If more than one preheating vessel 11 is employed, partially cooled combustion products 43 may be separated into two or more streams and supplied independently to such preheating vessels in parallel with vessel 11. In some cases, cooled combustion products exiting from a first preheating vessel 11 may still possess enough energy to preheat glass forming materials in one or more additional preheating vessels in series with vessel 11 before exiting the system as cooled combustion products.

It is possible to recover carbon dioxide from cooled combustion products 45 in optional recovery system 55, using any known techniques for the separation of $CO_2$ from flue gases generated during combustion. The recovery of $CO_2$ is particularly attractive with oxygen-based combustion since the amount of nitrogen to be handled is relatively small. Another benefit arises from the fact that it is possible to use the glass forming materials in preheating vessel 11 as a filtering medium. Thus the cooled combustion products 45 that emerge from preheating vessel 11 and are introduced into the optional recovery system 55 are relatively free of particulate impurities.

Since the specific heat of the oxidant is lower than that of the combustion products and since the overall volume of the oxidant is also relatively low, it may be found in some cases that the partially cooled combustion products 43 are still too hot (generally within the range of from 2000° F. to 2400° F.) to be passed directly into preheating vessel 11. Many commercial batch/cullet preheating units operate at temperatures generally in the range of from about 400° F. to 900° F. The inlet flue gas upper temperature limit for batch, cullet or batch/cullet preheaters is about 1400° F.

Accordingly, the energy recovery process disclosed herein can incorporate one or more additional means of further cooling the combustion products prior to introducing them into preheating vessel 11.

It is possible, for example, to employ air blower 13 to add dilution air 51 to mix with and further cool partially cooled combustion products 43 before using them in preheating vessel 11. Similarly, cooled combustion products 45, or a portion thereof, can be recirculated to mix with and to further lower the temperature of partially cooled combustion products 43.

It is a preferred embodiment of the invention, however, to further cool the combustion products prior to their use in preheating vessel 11 in an energy efficient manner, by redirecting as much of their heat as possible back to the glass melting process. To simplify the process and to increase its energy efficiency, it is in fact desirable to avoid the use dilution air 51 and/or the recirculation of cooled combustion products 45. If $CO_2$ is recovered in optional recovery system 55, the high concentration of $CO_2$ in cooled combustion products 45 is best maintained in the absence of dilution air.

Accordingly, in addition to heating oxidant stream 33, a portion of hot combustion products 41, or some or all of partially cooled combustion products 43, may also be used to heat fuel 31, thereby redirecting additional heat to melting vessel 17 and providing further cooling to the combustion products being passed to preheating vessel 11. Heating fuel 31 may be accomplished, for example, by indirect heat exchange.

Figure 3:
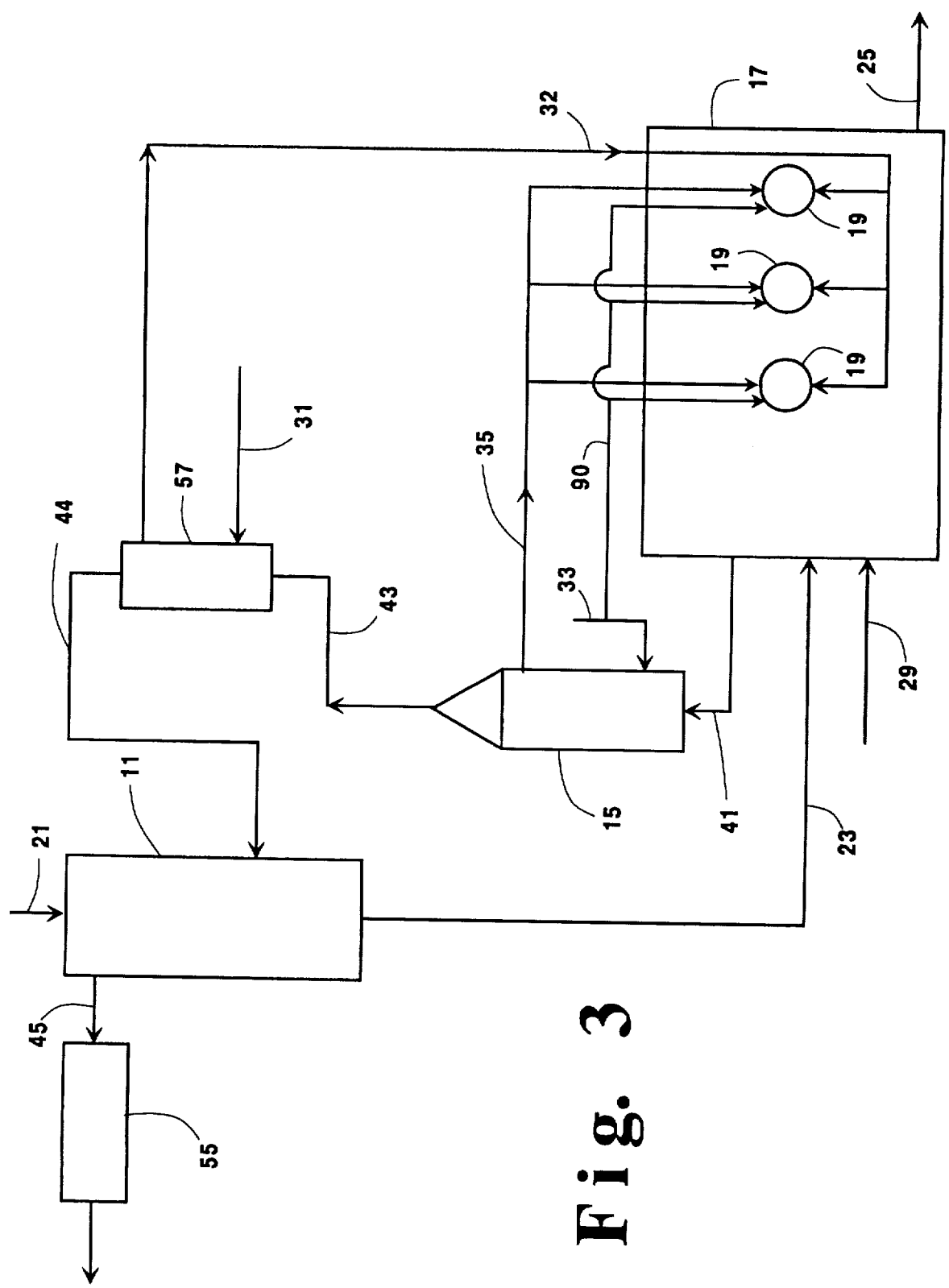
FIG. 3 is a representation similar to that of FIG. 1 also showing an additional heat exchanger for heating the fuel.

A preferred such embodiment is shown in FIG. 3. Referring now to FIG. 3 partially cooled combustion products 43 are passed from heat exchanger 15 to additional heat exchanger 57 wherein they are further cooled to a temperature generally within the range of from 1700° F. to 2200° F. by indirect heat exchange with fuel 31. Fuel 31 is supplied to additional heat exchanger 57 at a temperature lower than that of the partially cooled combustion products 43; fuel 31 may be supplied to additional heat exchanger 57 at ambient temperature and may be heated to a temperature generally within the range of from 400° F. to 1000° F. From additional heat exchanger 57, heated fuel 32 is passed to burners 19, while additionally cooled combustion products 44 are passed to preheating vessel, from which they emerge as cooled combustion products 45.

In another preferred embodiment, not shown, one heat exchanger can be adapted to separately heat both the oxidant stream 33 and fuel 31 by indirect contact with hot combustion products 41. This can be accomplished, for example, by providing separate compartments for the flows of fuel and oxidant, thereby preventing any direct contact between them within the heat exchanger.

Further cooling of the combustion products, prior to their use in preheating vessel 11, can also be accomplished within melting vessel 17, preferably by direct heat exchange between hot combustion products and colder glass forming materials. In a preferred embodiment, the hot combustion products are passed over glass forming materials under counter-current flow conditions, with the hot combustion products sweeping over the surface of glass forming materials in a direction opposite to that in which glass forming materials are passed through melting vessel 17.

The in-furnace precooling of the hot combustion products is particularly useful for cases where only some glass forming materials, for example cullet, are preheated in preheating vessel 11, while other glass forming materials, for example batch, are supplied directly to melting vessel 17, without being preheated in preheating vessel 11.

Figure 4:
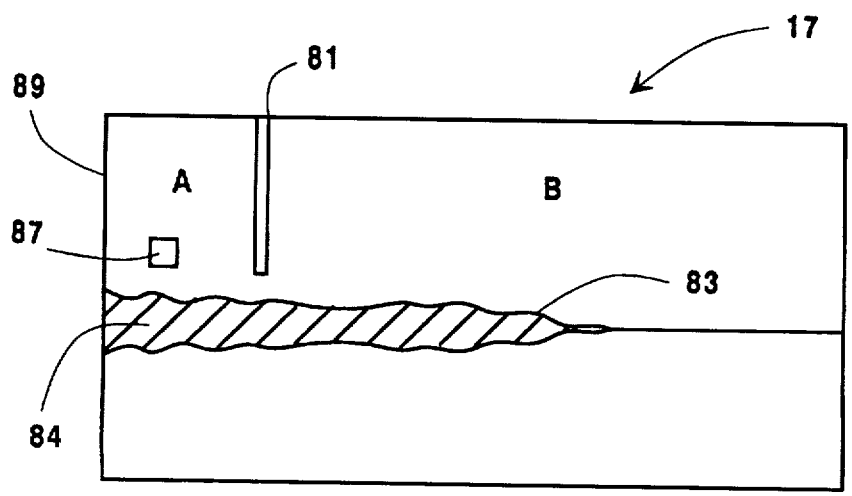
FIG. 4 is a simplified vertical cross-sectional view of the melting vessel showing a shadow wall.

FIG. 4, not drawn to scale, shows a preferred embodiment for precooling the hot combustion products within the furnace. FIG. 4 shows melting vessel 17 wherein glass forming materials are continuously introduced at charging wall 89 and are shown as shaded area 84. Melting vessel 17 is provided with a radiation barrier or shadow wall 81 which extends from the top of the furnace towards glass surface 83; a gap is formed between the tip of shadow wall 81 and glass surface 83.

Shadow wall 81 serves to partition vessel 17 into two zones above the glass surface 83: a receiving zone A, between charging wall 89 and shadow wall 81, and a combustion zone B, where burners 19 are located and where the combustion takes place generating hot combustion products and heat to melt glass forming materials.

A particular advantage of carrying out the combustion with oxygen or with oxygen-enriched air is the relatively small volume of hot combustion products being formed. Compared to an air-based furnace, significantly less glass surface area is required to provide in-furnace cooling for this small volume of hot combustion products. Accordingly, shadow wall 81 may be placed relatively close to the charging wall 89. It is possible to place shadow wall 81 at a distance from the charging wall 89 which is less than one third the length of melting vessel 17. In the practice of this invention, with or without the use of the melter shown in FIG. 4, no additional heating, such as by bottom electrodes, is required to carry out the melting. This is an important advantage of this invention. Shadow wall 81 acts as a barrier to reduce the radiative heat exchange between zone A and zone B; thus receiving zone A operates at a temperature lower than that found in combustion zone B. The hot combustion products formed by combustion in zone B, pass through the gap underneath shadow wall 81, into zone A, where they encounter lower operating temperatures and transfer energy to the glass forming materials being charged into melting vessel 17. Glass forming materials are thereby preheated within receiving zone A, prior to being melted in combustion zone B, while the hot combustion products undergo a degree of precooling prior to being extracted from melting vessel 17 through exhaust opening 87; therefrom, the precooled hot combustion products are passed to heat exchanger 15, and then to preheating vessel 11, substantially as discussed in connection with FIG. 1.

By precooling the hot combustion products within melting vessel 17, it is expected that the temperature of combustion products entering heat exchanger 15 will be lower than 2400° F. and will generally be within the range of from about 1600° F. to about 2100° F. Subsequent cooling in heat exchanger 15 will generate partially cooled combustion products at temperatures closer to those required by preheating vessel 11.

In-furnace precooling of hot combustion products in conjunction with in-furnace preheating of glass forming materials presents the advantages of redirecting waste heat back to the glass melting process, precooling the hot combustion products before they are introduced into heat exchanger 15, thus exposing the heat exchanger to more moderate heating, and of further reducing the temperature of partially cooled combustion products 43 prior to passing them to preheating vessel 11.

The various means of providing further cooling to the combustion products prior to their passage to preheating vessel 11 can be used alone or in any combination that would satisfy the energy and equipment requirements of the glass melting process. It may be found that heating both the combustion oxidant and the combustion fuel combined with in-furnace preheating of glass forming materials may considerably reduce or entirely eliminate the need for dilution air or for the recirculation of cooled combustion products. From an energy efficiency standpoint, this offers the advantage of redirecting most of the waste energy back to the glass melting process.

The following examples are provided for illustrative purposes and are not intended to be limiting.

EXAMPLE 1

The results of Example 1 are illustrated in FIG. and demonstrate that using heated oxygen does not significantly increase the production of $NO_x$. In this example, a test furnace 3 feet in diameter by 10 feet 7 inches in height was maintained at a temperature of about 2800° F. The furnace was used to combust natural gas with oxidant; the average oxygen concentration of the oxidant was about 95.3 weight percent. The oxygen was supplied at a rate 2 percent in excess of stoichiometric and some oxygen was therefore present in the flue gas. In order to simulate actual industrial furnace conditions, a level of 5 or 10 percent (by volumetric wet basis) of nitrogen was maintained in the furnace. For a furnace nitrogen level of 5 percent, for example, nitrogen was supplied to the furnace at a flow rate of 164 SCFH (standard cubic feet per hour); natural gas and oxidant were injected into the furnace at 1000 SCFH and 2170 SCFH, respectively. Combustion products corresponding to these rates were calculated to be about 1034 SCFH of carbon dioxide, 2068 SCFH water, 67 SCFH oxygen and 164 SCFH of nitrogen.

The combustion was carried out in stages: 20% (points represented by rhombuses or triangles in FIG. 5) or 30% (points represented by squares or circles) of the stoichiometric amount of the oxygen needed to complete the combustion was supplied as primary oxidant at ambient temperature through a burner such as the one disclosed and/or claimed in U.S. Pat. Nos. 5,267,850 and 5,411,395. The remaining oxygen needed to complete the combustion was supplied as secondary oxygen through an injection system such as that disclosed and/or claimed in U.S. Pat. No. 5,266,025. The velocity of the secondary oxidant through the lance was 195 to 240 feet/second and depended upon the actual volume of preheated oxidant; the velocity of the natural gas was 319 feet/second. The secondary oxidant was heated by combusting a small amount of fuel with oxygen.

Figure 5:
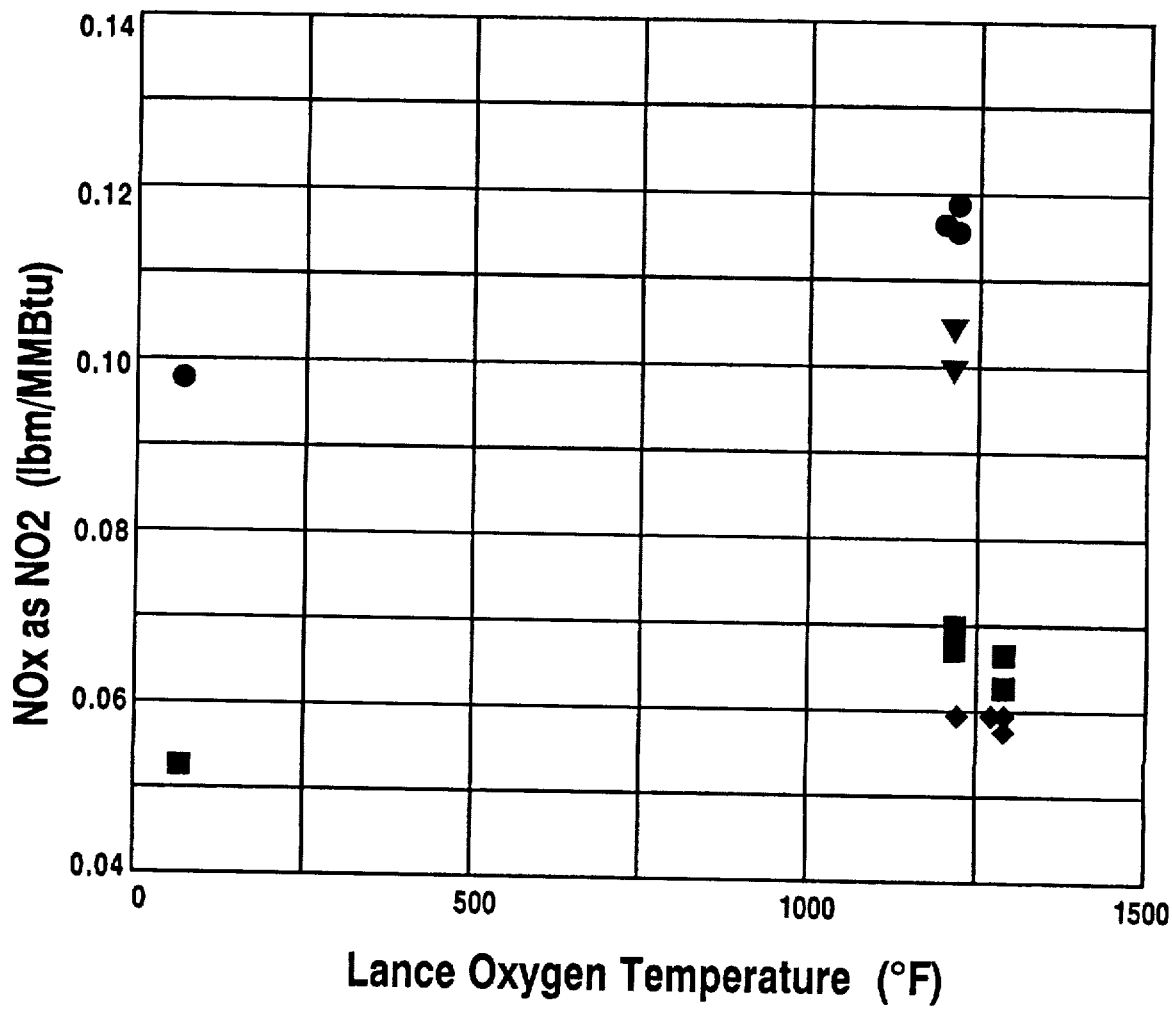
FIG. 5 is a graphical representation illustrating the minimal effects of heating the combustion oxidant on the production of $NO_x$.

FIG. 5 shows the effect on $NO_x$ production (shown on the vertical axis in pounds of $NO_2$ per million BTU) as a function of heating the secondary oxidant from ambient temperature to about 1300° F. It can be seen that generally raising the temperature of the secondary oxidant by some 1200° F. has only a very minor effect upon the generation of $NO_x$. Looking, for example, at the data represented by the triangle points, only a 5.5% increase in $NO_x$ production is observed upon heating the oxidant from ambient temperature to 1200° F.

EXAMPLE 2

This example demonstrates an energy recovery arrangement in which, with the exception of heat losses to surfaces, the waste energy of the hot flue gases generated in the combustion is redirected to the glass melting process. There is no need for air dilution and/or for recirculating cooled flue gases.

The case illustrated is modeled for a directly fired 300 tons per day container glass melter using preheated oxidant, preheated fuel, preheated cullet and in-furnace batch preheating. The glass melting furnace is provided with a shadow wall as described above; both oxidant and fuel are heated in separate compartments of the same heat exchanger or recuperator, according to one preferred embodiment of the invention. Cullet is preheated in a counter-current flow, direct contact heat exchange preheater. 60,702 SCFH (standard cubic feet per hour) of high purity oxygen (99.9 weight percent) at about 1200° F. and 30,200 SCFH of natural gas at about 1000° F. are supplied to the combustion zone of the furnace. The receiving zone of the furnace is charged with 13,702 lbs/hr of wet (3% moisture content) batch at 77° F. and 13,497 lbs/hr of virtually dry cullet at about 800° F.

Taking into account ignition losses, air infiltration into the furnace and the moisture generated from glass forming materials, about 126,772 SCFH of hot flue gases with a composition of 37.4% $CO_2$, 54.5% $H_2O$, 6.2% $N_2$, 1.8% $O_2$, and 0.1% Ar are produced in the combustion zone of the furnace. From the combustion zone, the hot flue gases pass through the gap underneath the shadow wall to the receiving zone, where they transfer some energy to the glass forming materials, and exit the furnace at about 2100° F. Flue gases are passed from the glass melting furnace to the recuperator through a refractory-lined stack. Heat losses to the stack walls further reduce the temperature of the hot flue gases which enter the recuperator at 2010° F.

The recuperator also receives, into separate compartments, high purity oxygen and natural gas, both at 77° F. Through indirect heat exchange with the hot flue gases, oxygen exits the recuperator at about 1200° F. and natural gas at about 1000° F. The heated oxygen and heated natural gas are separately passed to the combustion zone of the glass melting furnace using well insulated piping which ensures minimal heat losses. The flue gases exiting the recuperator are at about 1376° F.

A refractory-lined stack leads the flue gases from the recuperator to the direct contact cullet preheater. Additional heat losses within the stack lower the temperature of the flue gases to about 1362° F., which is lower than the typical upper limit of about 1400° F. for the cullet preheater.

The cullet preheater is charged with 13702 lbs/hr of cullet (moisture content of 1.5 weight percent) at 77° F. Cullet is preheated by direct contact with the flue gases; 13497 lbs/hr of preheated and virtually dry cullet at 800° F. exit the preheater and are charged into the glass melting furnace. About 131,106 SCFH flue gases also exit the cullet preheater at about 580° F. (a temperature high enough to prevent water condensation within the exit flue gas duct) with a composition of 36.2% $CO_2$, 56% $H_2O$, 6% $N_2$, 1.8% $O_2$, and 0.1% Ar.

The energy input into this glassmaking furnace with in-furnace preheat, oxygen preheat, natural gas preheat, and cullet preheat is as follows: fuel: 2.45 MMBtu/ton of glass; oxidant preheat: 0.11 MMBtu/ton of glass; natural gas preheat: 0.07 MMBtu/ton of glass; and cullet preheat: 0.19 MMBtu/ton of glass.

EXAMPLE 3

This example is provided to illustrate the economic advantages that can be gained by practicing the invention. Shown in Table 1 is the summary of a modeling study for a 300 tons per day container glass furnace fired by technically pure oxygen (99.9 weight percent). It presents a comparison of various ways of recovering heat. The baseline case for the oxygen-fired glass melter with no heat recovery is shown in column A. Columns B, C and D show the energy and utilities requirements for the cases where waste energy from the flue gases is used, respectively, in preheating the combustion oxygen, the batch/cullet preheater and both the combustion oxygen along with the batch/cullet preheater.

Column E illustrates the economic advantages of an energy recovery arrangement such as that described in Example 2.

Compared to batch/cullet preheating (column C), oxygen/batch/cullet preheating (column D) offers a reduction of approximately 5% in fuel and oxygen utilities, resulting in lowered operating costs for the glass producer.

Using in-furnace batch preheating in combination with cullet, oxygen and natural gas preheating (column E) further lowers the fuel and oxygen requirements and a 13.5% reduction in these utilities can by obtained with respect to batch/cullet preheating (column C).

TABLE 1

|  | A | B | C | D | E |
|---|---|---|---|---|---|
| ENERGY INPUT (MMBTU/TON) | | | | | |
| FUEL | 3.61 | 3.44 | 2.83 | 2.69 | 2.45 |
| OXIDANT PREHEAT | 0.00 | 0.12 | 0.00 | 0.09 | 0.11 |
| NATURAL GAS PREHEAT | 0.00 | 0.00 | 0.00 | 0.00 | 0.07 |
| BATCH PREHEAT | 0.00 | 0.00 | 0.29 | 0.29 | 0.00 |
| CULLET PREHEAT | 0.00 | 0.00 | 0.10 | 0.10 | 0.19 |
| TOTAL INPUT | 3.61 | 3.56 | 3.22 | 3.18 | 2.82 |
| ENERGY OUTPUT (MMBTU/TON) | | | | | |
| ENERGY TO GLASS | 1.80 | 1.80 | 1.80 | 1.80 | 1.63 |
| FLUE LOSSES (TOTAL) | 1.44 | 1.39 | 1.06 | 1.02 | 0.83 |
| WALL HEAT LOSSES (TOTAL) | 0.37 | 0.37 | 0.36 | 0.36 | 0.35 |
| TOTAL OUTPUT | 3.61 | 3.56 | 3.22 | 3.18 | 2.82 |
| UTILITY REQUIREMENTS | | | | | |
| FUEL (MMBTU/HR) | 45.18 | 42.95 | 35.35 | 33.63 | 30.59 |
| OXIDANT CONSUMPTION (SCFH) | 90,629 | 86,158 | 70,149 | 66,732 | 60,702 |

Now by using the method of this invention one can carry out glass melting with high energy efficiency and with reduced $NO_x$ generation. Although the invention has been described in detail with reference to certain embodiments, it will be appreciated by those skilled in the art that there are other embodiments of the invention within the spirit and the scope of the claims.

What is claimed is:

1. A glass melting method having improved energy recovery comprising:
   (A) passing heated glass forming materials into a melting vessel;
   (B) combusting fuel and heated oxidant to produce hot combustion products and to provide heat for melting said heated glass forming materials in the melting vessel;
   (C) withdrawing said hot combustion products from said melting vessel;
   (D) transferring heat from said hot combustion products to an oxidant by co-current indirect heat exchange, said oxidant being at a temperature lower than said hot combustion products and having an oxygen concentration of at least 50 weight percent, wherein there is substantially no temperature reduction of the hot combustion products from the withdrawal from the melting vessel to the co-current heat exchange, to produce partially cooled combustion products and said heated oxidant; and
   (E) transferring heat from said partially cooled combustion products to glass forming materials to produce said heated glass forming materials and to produce cooled combustion products.

2. The method of claim 1 wherein said oxidant has an oxygen concentration of at least 90 weight percent.

3. The method of claim 1 wherein the fuel and from 70 to 100 percent of the heated oxidant are injected into the melting vessel separately and spaced from each other prior to their combustion.

4. The method of claim 1 wherein the temperature of the heated oxidant is within the range of from about 200° F. to 1500° F.

5. The method of claim 1 wherein the melting vessel is divided by a shadow wall into a first zone for receiving glass forming materials and a second zone for melting said glass forming materials and for producing said hot combustion products.

6. The method of claim 5 wherein said glass forming materials are passed from the first zone to the second zone and the hot combustion products are passed in direct contact with said glass forming materials within the melting vessel.

7. The method of claim 1 wherein said fuel is heated by heat exchange with a portion of the hot combustion products.

8. The method of claim 1 wherein said fuel is heated by heat exchange with at least a portion of the partially cooled combustion products.

9. The method of claim 1 wherein air is mixed with said partially cooled combustion products, said air being at a temperature lower than that of said partially cooled combustion products.

10. The method of claim 1 wherein at least a portion of said cooled combustion products is recycled to and mixed with said partially cooled combustion products prior to the transfer to the glass forming materials.

11. The method of claim 1 further comprising a step of recovering carbon dioxide from at least a portion of the cooled combustion products.

12. The method of claim 1 further comprising providing additional non-heated oxidant for combustion with fuel to provide heat in the melting vessel.

* * * * *